W. S. COOPER.
Faucet and Cock.

No. 222,870. Patented Dec. 23, 1879.

Witnesses
Henry Howson Jr.
Harry Smith

Inventor
William S. Cooper
by his Attorneys
Howson & Son

UNITED STATES PATENT OFFICE.

WILLIAM S. COOPER, OF PHILADELPHIA, PENNSYLVANIA.

IMPROVEMENT IN FAUCETS AND COCKS.

Specification forming part of Letters Patent No. 222,870, dated December 23, 1879; application filed November 17, 1879.

*To all whom it may concern:*

Be it known that I, WILLIAM S. COOPER, of Philadelphia, Pennsylvania, have invented a new and useful Improvement in Faucets and Cocks, of which the following is a specification.

My invention relates to a certain improvement in that class of faucets in which a threaded portion of the valve-stem is adapted to a nut held in a fixed position within the casing, the object of my invention being to insure the firm retention of said nut in its proper position without the necessity of ribbing or slotting the casing of the faucet or the sides of the nut. This object I attain in the manner which I will now proceed to describe, reference being had to the accompanying drawings, in which—

Figure 1:
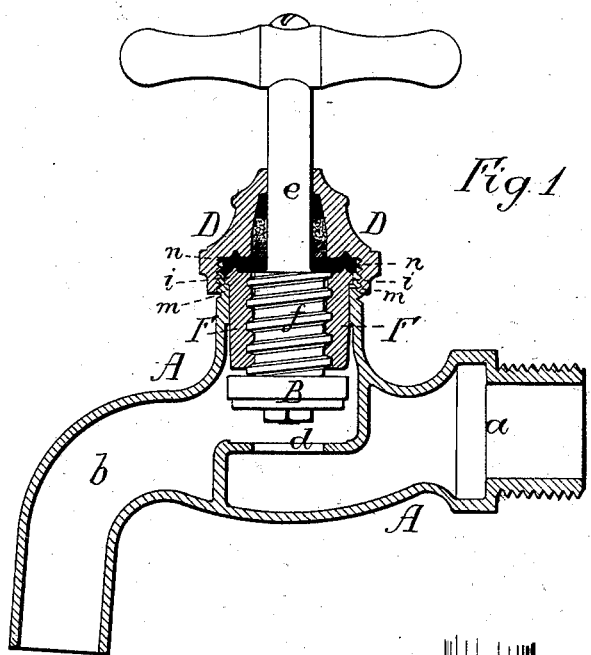
Figure 2:
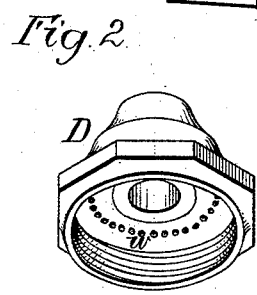
Figure 3:
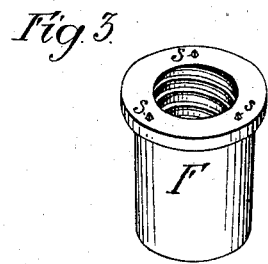
Figure 4:
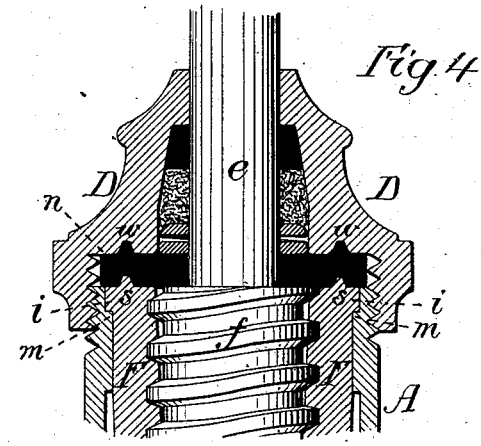

Figure 1 is a longitudinal sectional view of the faucet constructed according to my invention; Fig. 2, a perspective view of the under side of the screw-cap of the faucet; Fig. 3, a perspective view of the operating-nut detached from the casing, and Fig. 4 an enlarged view of part of Fig. 1.

A is the casing of the faucet; $a$, the inlet-passage; $b$, the discharge-passage, and $d$ the valve-seat. B is the valve, the stem $e$ of which passes through the usual stuffing-box in the cap D, the latter being screwed onto the upper end of the vertical tubular portion of the casing in the ordinary manner.

The threaded portion $f$ of the stem $e$ is adapted to a nut, F, which fits snugly within the said vertical tubular portion of the casing, an external flange, $i$, on the upper edge of the nut being adapted to an internal shoulder, $m$, near the upper end of the casing. The nut F is retained in its proper vertical position by the pressure of the cap D, exerted through the medium of the packing-ring $n$; and in order to prevent the turning of the nut in the casing, projections $s$, Fig. 3, are formed on the upper edge of said nut, these projections, when the cap D is screwed down, serving to indent the packing-ring $n$, and force portions of the same into recesses $w$, formed in that portion of the cap against which the ring $n$ is seated. When the parts are in this position the cap D, the ring $n$, and the nut F are prevented from turning independently of each other, so that in order to turn the nut force sufficient to unscrew the cap D must be exerted.

The casing is simply trued for the reception of the nut, and the latter is then dropped into place, no particular adjustment being necessary, as in the case of faucets in which ribs on the nut are adapted to slots or grooves in the casing, or vice versa.

The absence of ribs and grooves also serves to cheapen the cost of making and fitting up the faucet.

I claim as my invention—

The combination of the casing A, the nut F, having projections $s$ on its upper edge, the packing-ring $n$, and the screw-cap D, having recesses $w$, all substantially as set forth.

In testimony whereof I have signed my name to this specification in the presence of two subscribing witnesses.

WILLIAM S. COOPER.

Witnesses:
ALEXANDER PATTERSON,
HARRY SMITH.